United States Patent [19]

Ueda et al.

[11] 3,846,639
[45] Nov. 5, 1974

[54] CONTROL SYSTEM FOR ELECTRIC INSTALLATIONS FOR USE ON VEHICLE

[75] Inventors: Atsushi Ueda; Mitsuaki Ishii, both of Himeji, Japan

[73] Assignee: Mitsubishi Denki Kabushiki Kaisha, Tokyo, Japan

[22] Filed: Mar. 21, 1973

[21] Appl. No.: 343,480

[52] U.S. Cl. .................. 307/9, 340/52 F, 340/147, 340/169
[51] Int. Cl. .......................... G08c 15/12, H02g 3/00
[58] Field of Search ................. 307/10 R, 10 LS, 9; 340/52 F, 147 R, 147 B, 163, 169; 179/15 AW

[56] References Cited
UNITED STATES PATENTS

| 3,440,657 | 4/1969 | Cataldo .................. 179/15 AW |
| 3,544,803 | 4/1968 | Taylor ...................... 307/10 R |
| 3,564,280 | 2/1971 | Sognefest et al. ......... 307/10 R X |
| 3,648,057 | 3/1972 | Sognefest et al. ........... 307/10 R |
| 3,651,454 | 3/1972 | Venema et al. ........... 307/10 R X |

Primary Examiner—Robert K. Schaffer
Assistant Examiner—William J. Smith
Attorney, Agent, or Firm—Robert E. Burns; Emmanuel J. Lobato; Bruce L. Adams

[57] ABSTRACT

A transmitter responds to clock pulses to generate a pulse train including an index pulse and PWM intelligence pulses arranged in a predetermined order resulting from respective signal sources one for each electric installation. The pulse train is transmitted via a single line to plural detectors one for each electric installation. In each detector, that intelligence pulse assigned to it is sampled by counting the intelligence pulses for each occurrence of the index pulse. By discriminating its width, the sampled pulse is determined if it is to turn the associated electric installation ON. When determined so, the sampled pulse turns that electric installation ON.

4 Claims, 7 Drawing Figures

CONTROL SYSTEM FOR ELECTRIC INSTALLATIONS FOR USE ON VEHICLE

BACKGROUND OF THE INVENTION

This invention relates to a control system for electric installations, and more particularly to a control system for controlling a plurality of electric installations or devices equipped on a vehicle or the like through the use of a single length of control wire.

Electric installations equipped on a vehicle or the like involve those controlled manually by its operator or driver, for example, the headlight, wiper etc. and controls operative without first being enabled by the driver, for example, indicators such as a fuel meter and regulators. In the interest of security, convenience etc., there is currently a tendency to increase the number and types of electric installations equipped on a vehicle. This has led to an increasingly complicated circuit configuration of electric wire required for the connection to those many electric installations and therefore to an increase in costs of manufacturing and installing them. Furthermore, it has been very difficult to check and repair the electric installation upon their failures.

SUMMARY OF THE INVENTION

Accordingly it is an object of the present invention to provide a new and improved control system for controlling a plurality of electric installations equipped on a vehicle or the like having a simple circuit for interconnection of the electric installations with the control system through the utilization of a time-division multiplexing technique.

The present invention is a control system for controlling electric installations equipped on a vehicle, comprising in combination, a plurality of electric installations to be controlled, a transmitter unit including a plurality of signal sources for providing respective intelligence bearing signals having information content, one for each of the electric installations, an index generator circuit for generating index pulses, an intelligence generator circuit responsive to the index pulse generated by the index generator circuit to generate intelligence pulses or information pulses including the intelligence from the signal sources and provide them after incremental delay times, and a control generator circuit for receiving the index pulse and intelligence pulses to form a control pulses train, a transmission line connected to the control generator circuit, and a plurality of signal detector units for receiving the control pulse train one for each of the electric installations, each of the signal detector means including means for receiving the control pulse train to separate the index pulse from the pulse train, a counter circuit for counting the intelligence pulses after each of the index pulses is received; a decoder circuit for detecting that count having a desired value on the counter circuit to provide a separation pulse, an intelligence separation circuit responsive to the separation pulse to separate from the pulse train that intelligence pulse assigned to the associated electric installation, a pulse discrimination circuit for descriminating the intelligence pulse separated by the intelligence separation circuit, and a driving circuit for driving the associated electric installation in accordance with the output from said pulse discrimination circuit.

The pulse discrimination circuit may preferably discriminate the duration of the intelligence pulse separated by said intelligence separation circuit.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
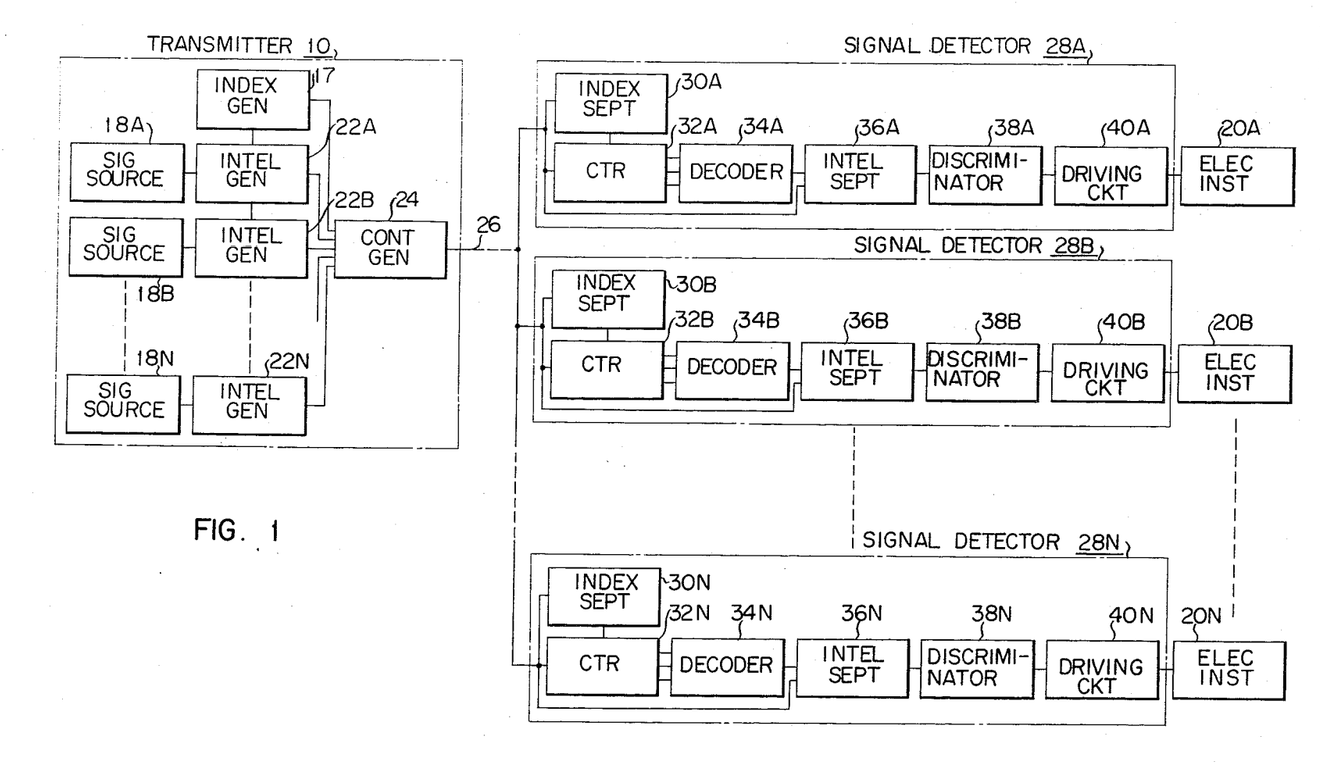
FIG. 1 is a block diagram of the fundamental form of the present invention useful in explaining the principles thereof.

Referring now to FIG. 1 of the drawings, there is illustrated a control system for controlling a plurality of electric installations in accordance with the principles of the present invention. The embodiment of the invention illustrated includes a transmitter unit generally designated by the reference numeral 10 and comprising an index pulse generator circuit 17 for generating index pulses, as will be described hereinafter, and a plurality of signal sources 18A, 18B . . . , 18N disposed in place on the vehicle (not shown) and connected to respective intelligence pulse generator circuits 22A, 22B, . . . , 22N. The pulse generator circuits 17 and 22A, 22B, . . . , 22N are connected to a control signal generator circuit 24 which is, in turn, connected to a single transmission line 26 leading to a plurality of signal detector units generally designated by the reference numerals 28A, 28B, . . . , 20N and connected to the corresponding electric installations 20A, 20B, . . . , 20N respectively. It will readily be understood that the signal detector units 28 are disposed at positions determined by the positions of the associated electric installations 20.

The signal detector units 28 are of the same construction and therefore only one, for example, the signal detector unit 28A will now be described. The signal detector unit 28A comprises an index separation circuit 30A connected to the transmission line 26, and a counter circuit 32A connected at one input also to the transmission line 26 and at the other input to the index separation circuit 30A. The counter circuit 32A is then connected through a plurality, in the example illustrated three, of electric leads to a decoder circuit 34A subsequently connected to an intelligence separation circuit 36A. The intelligence separation circuit 36A is connected to the electric installation 20A through a signal discriminator circuit 38A and a driving circuit 40A connected in cascade thereto.

In each of the remaining signal detector units the components are designated by the same reference numerals as the corresponding components of the detector unit 34A suffixed with the reference character identifying each detector unit. For example, the decoder circuit included in the signal detector unit 28B is designated by "34B".

The operation of the arrangement as shown in FIG. 1 will now be described with reference to FIG. 2.

Figure 2:
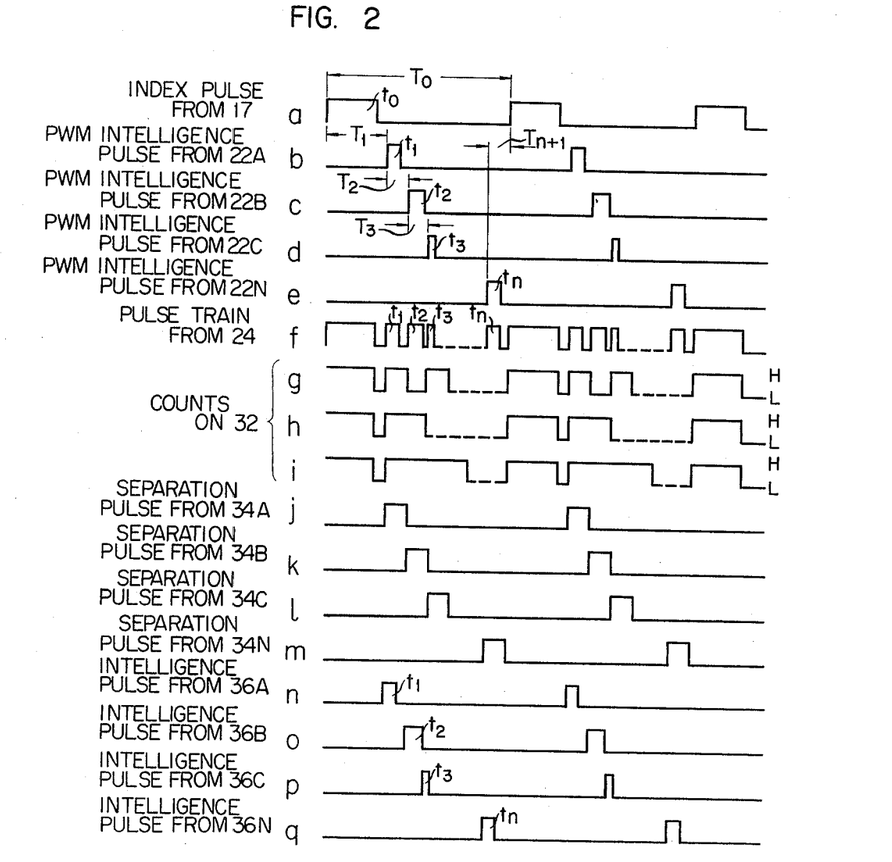
FIG. 2 is a graph illustrating waveforms developed of various points in the arrangement shown in FIG. 1.

In the transmitter unit 10 the index pulse generator circuit 17 generates rectangular index pulses having a pulse repetition period of $T_o$ and a duration of $t_o$ as shown at waveform $a$ in FIG. 2. The index pulses are applied to both the intelligence pulse generator circuit 22A and the control signal generator circuit 24. The intelligence pulse generator circuit 22A is triggered with the index pulse $t_o$ to sample an intelligence from the signal source 18A corresponding to the electric installation 20A after the lapse of a time interval of $T_1$ thereby to generate a pulse-width modulated (PWM) intelligence pulse $t_1$ as shown at waveform $b$ in FIG. 2. Thus PWM intelligence pulse $t_1$ is applied to the intelligence pulse generator circuit 22B to trigger the latter and also to the control signal generator circuit 24. The triggered generator circuit 22B samples an intelligence from the signal source 18B corresponding to the electric installation 20B at the end of a time interval of $T_2$ measured from the occurrence of leading edge of the preceding pulse $t_1$, and generates a PWM intelligence pulse $t_2$ as shown at waveform $c$ in FIG. 2. The pulse $t_2$ is then applied to both the succeeding intelligence pulse generator circuit 22C and the control generator circuit 24.

The process as above described is successively repeated with each of the succeeding intelligence pulse generator circuits 22 to generate PWM intelligence pulses $t_3, \ldots t_n$ with incremental delay times of $T_3, \ldots T_n$ with respect to the preceding pulses (see waveforms $d$ and $e$ shown in FIG. 2). The pulse $t_n$ is similarly applied to the control generator circuit 24.

On the other hand, the pulses $t_o, t_1, \ldots t_n$ applied to the control generator circuit 24 are combined together into a time divided multiplexed signal or a pulse train as shown at waveform $f$ in FIG. 2. As seem from waveform $f$, each of the pulse trains initiates with an index pulse $t_o$. That is, the index pulse $t_o$ indicates the initiation of each pulse train for the purpose as will be apparent later.

At the end of a time interval of $t_{n+1}$ after the occurrence of the last pulse $t_n$ of the pulse train a succeeding index pulse $t_o$ is applied to the index pulse generator 17 after which the process as above described is repeated.

From the foregoing it will be appreciated that the pulse repetition period $T_o$ of the index pulses $t_o$ is equal to the sum of the delay times $T_1, T_2, \ldots, T_n, T_{n+1}$. Also in order to prevent the intelligence pulses $t_1, t_2, \ldots t_n$ from temporally overlapping one another, the time intervals $T_1, T_2, \ldots T_n, T_{n+1}$ should be chosen to be greater than a longest one of the durations of the intelligence pulses $t_1, t_2, \ldots, t_n$. Also the time intervals $T_2, T_3, \ldots T_n, T_{n+1}$ are not required to be different from one thereof and the intelligence pulses may be generated at predetermined fixed time intervals. Alternatively, each of the intelligence pulses may be formed at a predetermined fixed time interval after the just preceding pulse has terminated. In addition, the index pulse $t_o$ must be distinguished from all the intelligence pulses $t_1, \ldots t_n$. To this end, the index pulse $t_o$ can have its duration equal to or greater than twice a maximum one of the durations of the intelligence pulses $t_1, t_2, \ldots, t_n$. If desired, the index pulse may be different in amplitude from the intelligence pulses.

The time-divided, multiplexed signal or pulse train from the control generator circuit 24 is transmitted via the single transmission line 26 to the plurality of signal detector units 28A, 28B, ..., 28N. All the signal detector units are identical in operation to one another except that the decoder circuits 34A, 34B, ... 34N are different from one another in that each provides an output only in response to a corresponding pulse in the pulse train. Therefore only one, for example, the signal detector unit 28B will now be, by way of example, described in detail.

In the signal detector unit 28B, the index separation circuit 30B receives the waveform $f$ or pulse train from the control generator circuit 24 through the single transmission line 26 to separate the index pulse $t_o$ from the pulse train to provide a resetting pulse for the counter circuit 32B. This resetting pulse is applied to the counter circuit 32B to reset or clear the latter. The reset counter 32B is initiated to count the intelligence pulses $t_1, t_2, \ldots t_N$ following that index pulse $t'_o$. In other words, when the index pulse $t'_o$ reaches the index separation circuit 30B, the resetting pulse is developed from that circuit. Then, each time one of the intelligence pulses reaches the counter circuit 32B, the latter counts "one" so that it produce binary counts in the form of a predetermined binary code, in the example illustrated, a conventional 3-bit binary code as shown at waveform $g, h$ and $i$ in FIG. 2 resulting in eight pulses being counted. If it is desired to count more than eight of the intelligence pulses, it is required only to increase in the number of bits utilized by the binary counter circuit 32B. The counts on the counter circuit 32B are successively applied to the decoder circuit 34B for decoding. More specifically, in the signal detector unit 28B, when the counter circuit 32B counts the second intelligence pulse $t_2$ from the index pulse it produces a corresponding output having the waveform $g$ portion low (L) in amplitude, the waveform $h$ portion high (H) in amplitude and the waveform $i$ portion high (H) in amplitude (see FIGS. 2$g$, 2$h$ and 2$i$). At that time the decoder 34B produces a separation pulse as shown at waveform $k$ in FIG. 2 corresponding to the electric installation 20B.

The waveform $k$ is applied to the intelligence separation circuit 36B also having directly applied thereto the time-divided, multiplexed pulse train on the transmission line 26. From FIGS. 2$f$ and 2$j$ it will be seen that, when the waveform $k$ is being applied to the intelligence separation circuit 36B, the pulse portion labelled "$t_2$" of the pulse train or waveform $f$ is applied to the same circuit 36B thereby to be separated from the pulse train as shown at waveform $o$ in FIG. 2. The intelligence pulse thus separated in labelled "$t_2$" in FIG. 2$_o$ and applied to the discriminator circuit 38B to be restored to the original intelligence provided by the source 18B. Then the driving circuit 40B responds to the restored intelligence signal from th discriminator circuit 38B to cause the electric installation 20B to be driven into operation through a power line (not shown). The process as above described is repeated with each of the index pulses $t_o$ or for each period $T_o$.

The remaining signal detector units 28 operate in the same manner as does the detector units 28B but the decoders 34 are different from one another in the count on the associated counter circuit to which it responds to provide an output. When the counter circuits 32A, 32B, . . . , 32N count predetermined numbers of the intelligence pulses respectively, the associated decoder circuits produce respective outputs. For example, when the counter circuit 32A counts a first intelligence pulse $t_1$ from the index pulse $t_0$, the counter circuit 32A produces its output including the waveform g portion high (H) in amplitude, the waveform h portion high (H) in amplitude as shown in FIGS. 2g, 2h and 2i, resulting in the formation of waveforms j and n as shown in FIG. 2. The decoder 34N is adapted to respond to that count on the associated counter circuit 32N resulting from the Nth intelligence pulse $t_n$ from the index pulse $t_0$ to produce the g portion low (L), the h portion low (L) and the i portion low as shown in FIGS. 2g, 2h and 2i leading to the formation of waveforms h and 0 as shown in FIG. 2.

In this way, selected ones of the electric installations 28A, 28B, . . . , 28N can be driven in accordance with those intelligence pulses assigned thereto and picked up from the control signal transmitted through the transmission line 26.

In the arrangement as shown in FIG. 1, one intelligence pulse assigned to each of the electric installations 20A, 20B, . . . , 20N is delivered only once during the period $T_0$ of the index pulses $t_0$ pulse repetition. Under these circumstances, if the intelligence pulses have a pulse repetition frequency or the reciprocal of the time interval $1/T_0$ preselected to exceed twice a maximum one of the frequencies produced by the signal sources 18A, 18B, . . . , 18N then the original intelligences as provided by the sources can be restored on the side of the electric installations in accordance with the sampling theorem well known in the art. Also the intelligence pulses originating from the respective signal sources can be identified on the receiving side only by the numbers assigned to the pulses following the index pulse. Thus it is essential to maintain a predetermined order in which the intelligence pulses are successively generated. Therefore the system is not at all affected by the duration, amplitude and location of each intelligence pulse. This eliminates the necessity of generating the intelligence pulses with a high accuracy and therefore facilitates the formation thereof.

Figure 3:
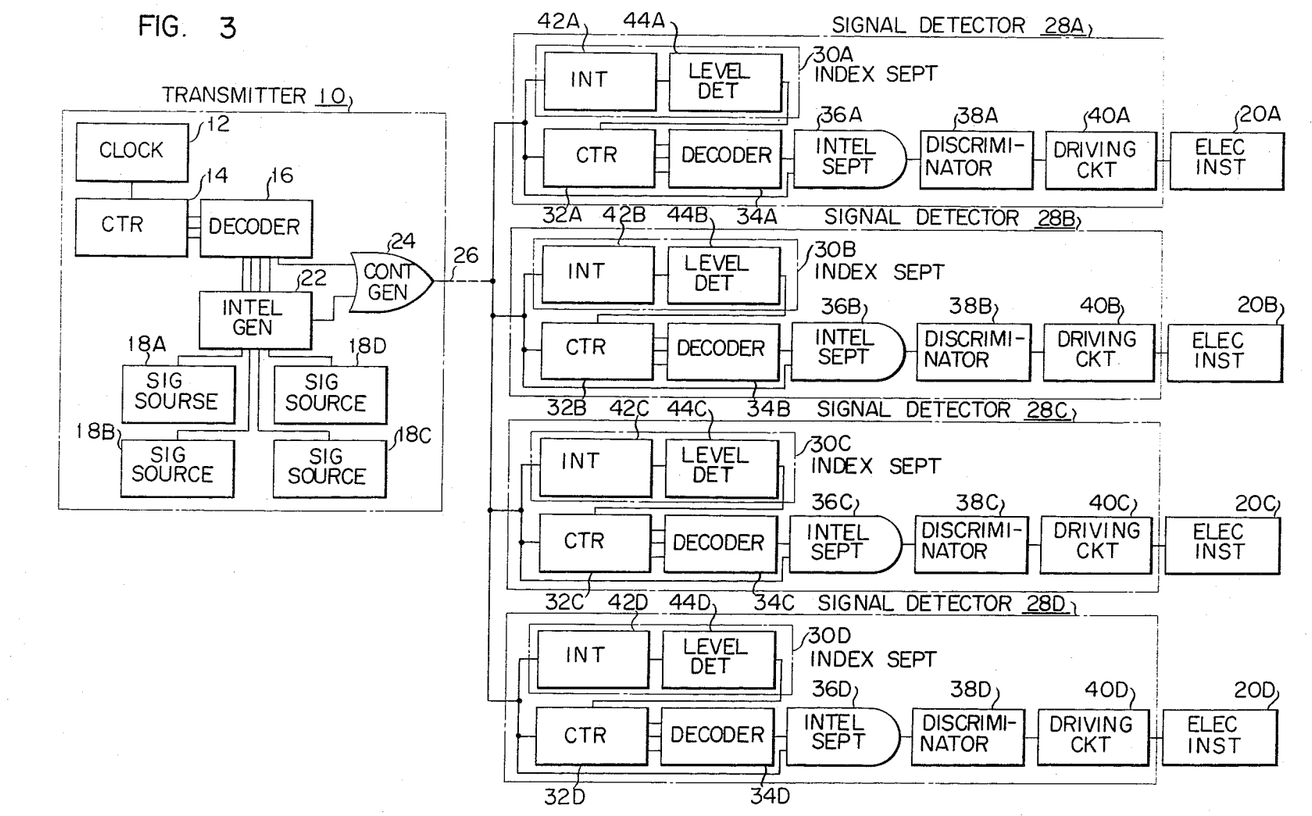
FIG. 3 is a block diagram of a control system for electric installations constructed in accordance with the principles of the present invention.

Referring now to FIG. 3 wherein like reference numerals designate the components corresponding or similar to those shown in FIG. 1, there is illustrated one embodiment of a control system for electric installations constructed in accordance with the principles of the present invention. In FIG. 3, the transmitter unit 10 is shown as including a clock 12 for providing a train of clock pulse, a counter circuit 14 for counting the clock pulses from the clock 12, and a decoder circuit 16 connected to the counter circuit 14 through a plurality, in this case, three of electric leads. The transmitter unit 10 further includes four signal sources assumed to be control switches 18A, 18B, 18C and 18D, and a single intelligence pulse generator circuit 22 connected at its inputs to four control switches 18A, 18B, 18C and 18D for controlling the operation of four electric installations 20A, 20B, 20C and 20D respectively. The intelligence pulse generator circuit 22 has additional inputs connected to the decoder circuit 16 through electric leads identical in the number to the control switches, and an output connected to the control signal generator circuit 24 shown as being an "OR" circuit. While the arrangement is shown in FIG. 3 as including four signal sources, it is to be understood that it may includes any desired number of the signal sources. It is also to be understood that in any event the signal sources, the signal detector units and the electric installations are identical in the number to one another.

In each of the signal detector units 28, the index separation circuit 30 is shown as consisting of an integration circuit 42 connected to the transmission line 26, and a level detector or threshold circuit 42 connected to the integration circuit 42 to supply an output to the counter circuit 32.

In other respects, the arrangement is identical to that shown in FIG. 1.

Figure 4:
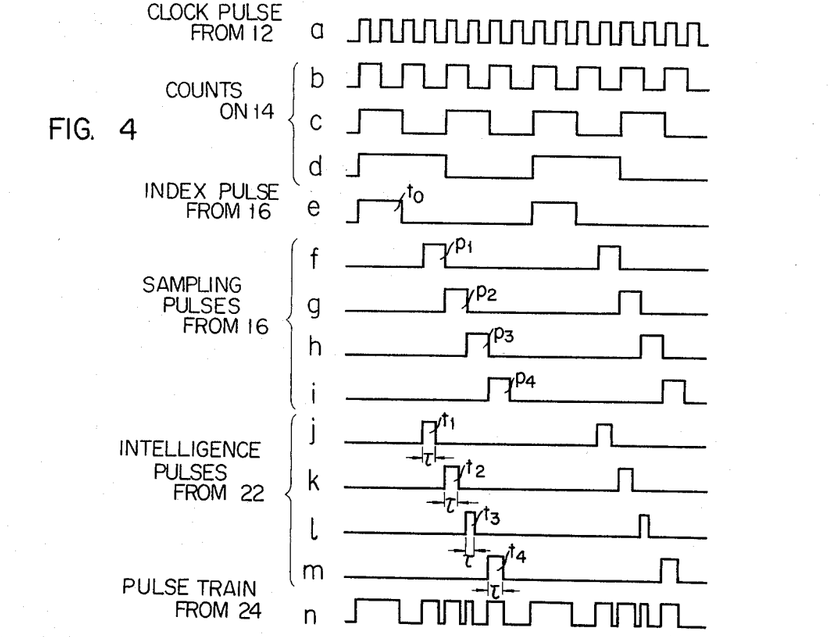
FIGS. 4 and 5 are graphs illustrating waveforms developed at various points in the arrangement shown in FIG. 3.

The arrangement of FIG. 3 is operated as follows:

The clock 12 generates a train of clock pulses (see waveform a shown in FIG. 4) as above described and the counter circuit 14 counts the clock pulses to provide conventional 3-bit binary coded signals having the bits represented by waveforms b, c and d shown in FIG. 4. Thus each time the counter circuit 16 has counted eight clock pulses it is cleared to repeat the counting process. The decoder circuit 16 receives the binary coded signals from the counter circuit 14 to form an index pulse $t_0$ (see waveform e shown in FIG. 4) and also successively form sampling pulses $p_1$, $p_2$, $p_3$ and $p_4$ of the fourth, fifth, sixth and seventh clock pulses respectively (see waveforms f, g, h and i shown in FIG. 4). In the example illustrated the index pulse $t_0$ has a duration equal to two periods of the clock pulses and the sampling pulses $p_1$, $p_2$, $p_3$ and $p_4$ have respective duration equal to one period thereof. The sampling pulses $p_1$, $p_2$, $p_3$ and $p_4$ are correspond to the control switches 18A, 18B, 18C and 18D respectively and are successively applied to the intelligence pulse generator circuit 22. The intelligence generator circuit 22 is first responsive to the first sampling pulse $p_1$ to generate an intelligence pulse $t_1$ resulting from the control switch 18A, in this case, a pulse indicating the closure thereof within the duration of the pulse $p_1$ (see waveform j shown in FIG. 4) and then responsive to the second sampling pulse $p_2$ to generate an intelligence pulse $t_2$ indicating the closure of the control switch 18B during the duration of the pulse $p_2$ (see waveform k shown in FIG. 2). The circuit 22 is similarly operative to generate intelligence pulses $t_3$ and $t_4$ during the durations of the associated sampling pulses $p_3$ and $p_4$ as shown at waveforms l and m in FIG. 4. The intelligence pulses $t_1$, $t_2$ and $t_4$ are shown in FIG. 4 as having a duration of $\tau$ somewhat shorter than that of the corresponding sampling pulses $p_1$, $p_2$ and $p_4$ or the period of the clock pulses and the intelligence pulse $t_3$ is shown as having a duration of $\tau/2$. This is because the control switches 18A, 18B and 18D are in their closed position while the control switch 18C is in its open position.

Then the index pulse $t_0$ and the intelligence pulses $t_1$, $t_2$, $t_3$ and $t_4$ are supplied to the OR circuit 24 where they are combined together into a pulse train as shown at waveform n in FIG. 4. The pulse train thus formed is transmitted via the single transmission line 26 to the all the signal detector units 26A, 26B, 26C and 26D.

Figure 5:
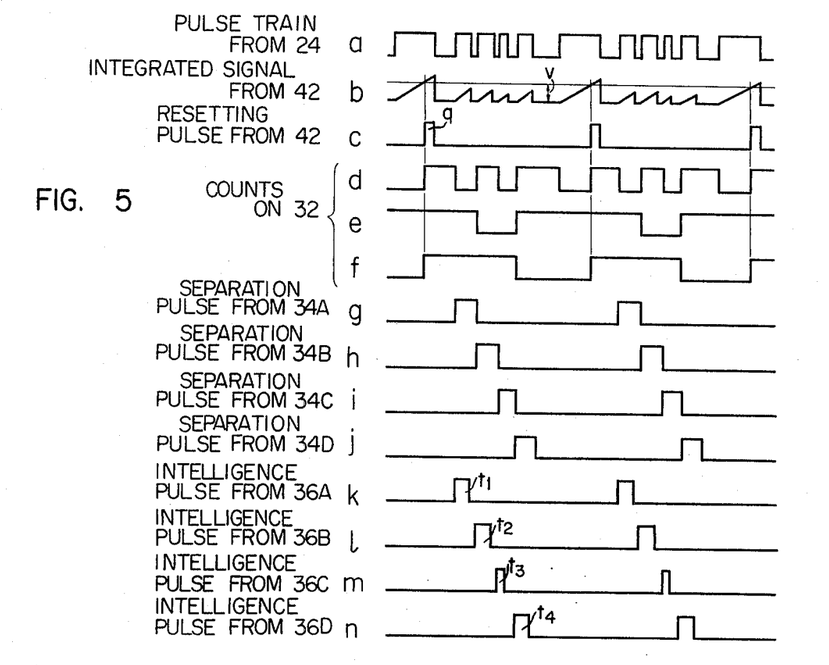

In each of the detector units 26, the integration circuit 42A, 42B, 42C or 42D integrates the pulse train (as also shown at waveform a in FIG. 5) into an integrated waveform b shown in FIG. 5. This integrated waveform b is applied to the associated level detector circuit or threshold circuit 44. The level detector circuit 44 is operative to respond to the application of a pulse having a level higher than a predetermined magnitude v to provide a resetting pulse $q$ as shown at waveform $c$ in FIG. 5. In this event, the level detector circuit 44 is arranged to provide the resetting pulse $q$ in response to only the index pulse $t_o$ which is longer in duration than the intelligence pulses. In this way, the integration circuit 42 cooperates with the associated level detector circuit 44 to separate the index pulse from the pulse train. The index pulse thus separated or resetting pulse $q$ is applied to the counter circuit 32 to reset or clear it.

Then the signal detector units 28A, 28B, 28C and 28D are operated in the same manner as above described in conjunction with FIGS. 1 and 2. In FIG. 5, the remaining waveforms $d$ through $n$ correspond to those $g$ through $q$ shown in FIG. 2 respectively.

In the arrangement of FIG. 3, each of the pulse discriminator circuits 38A, 38B, 38C or 38D is operative to discriminate the duration of the intelligence pulse received from the corresponding intelligence separation circuit 36A, 36B, 36C or 36D to determine whether the associated control switch is in its closed or open position. In the example illustrated, due to the closure of the control switch 18A, the corresponding intelligence pulse $t_1$ has the duration of $\tau$ to cause the pulse descriminator circuit 38A to provide an output thereby to put the associated electric installation 20A in operation through the driving circuit 40A connected thereto. Similarly, the intelligence pulses $t_2$ and $t_4$ will cause the electric installations 20B and 20D to be put in operation. On the other hand, the intelligence pulse $t_3$ has the duration of $\tau/2$ indicating the opening of the control switch 18C and therefore the associated electric installation 20C remains inoperative.

While the arrangement of FIG. 3 includes the four control switches disposed collectively in a single place it will be appreciated that the control switches or signal sources may be separately disposed in their positions as determined by the positions of the associated electric installations respectively.

Figure 6:
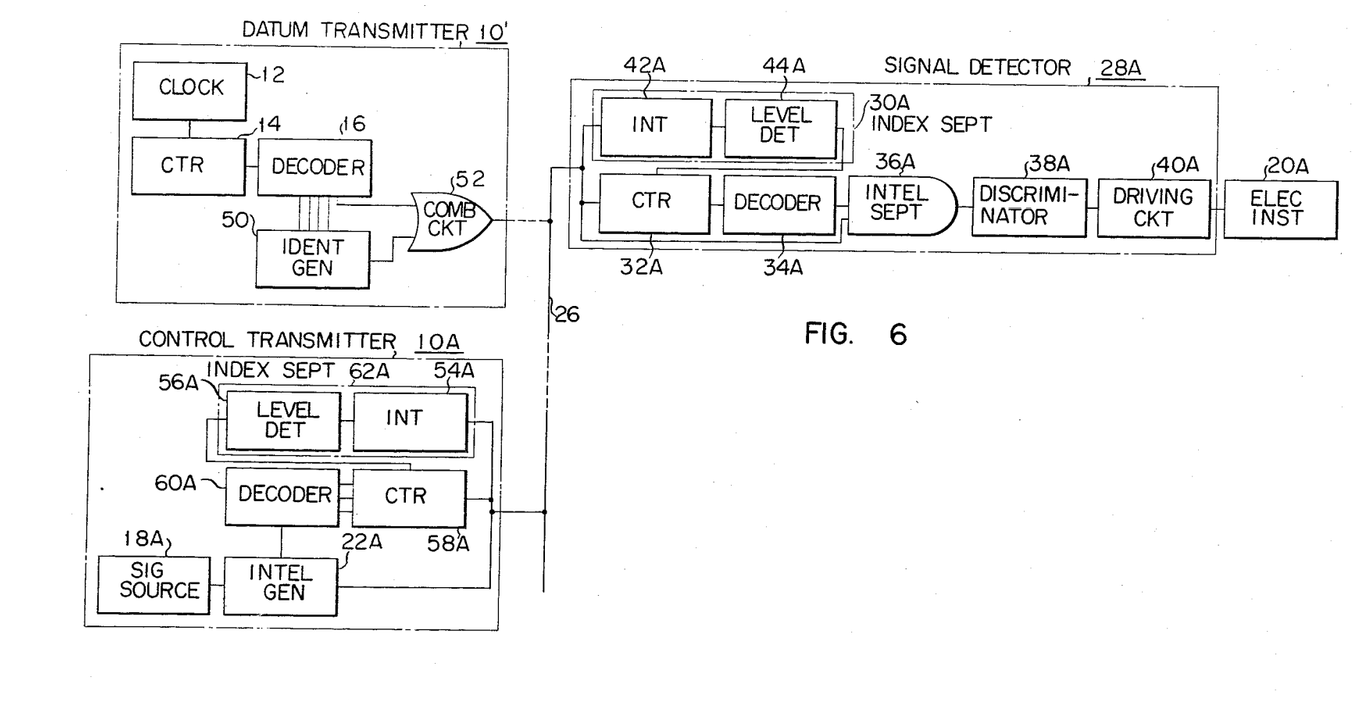
FIG. 6 is a view similar to FIG. 3 but illustrating a modification of the present invention.

FIG. 6 wherein like reference numerals designate the components corresponding or similar to those shown in FIG. 1 or 3 illustrates another embodiment of the present invention applied to a plurality of control sources separately disposed in their positions as determined by the positions of the associated electric installations on the vehicle (not shown). As shown in FIG. 6, a datum transmitter unit 10' comprises in addition to the clock 12, the counter circuit 14 and the decoder circuit 16 as above described in conjunction with FIGS. 3 and 4, an identifier pulse generator circuit 50 connected to the decoder circuit 16 through a plurality, in this case, four of electric leads one for each of the signal sources or control switches 18 and a combination circuit shown as being an "OR" circuit 52 connected at the inputs to the decoder and generator circuits 46 and 50 respectively. The "OR" circuit 52 is shown as being connected to both a signal detector unit 28A and a control transmitter unit 10A through a single transmission line 26 only for purposes of illustration.

The signal detector unit 28A is identical to the detector unit 28A as above described in conjunction with FIGS. 3 and 5 and connected to the electric installation 20A.

The control transmitter unit 10A includes the control switch 18A shown in FIG. 3 and the intelligence pulse generator circuit 22A identical to that shown in FIG. 1 and connected to the control switch 18A. The control transmitter unit 10A further includes an integration circuit 54A, a level detector circuit or a threshold circuit 56A, a counter circuit 58A and a decoder circuit 60A identical to the corresponding circuits 42A, 44A, 32A and 34A disposed in the signal detector unit 28A and interconnected in the same manner as those circuits. The integration and threshold circuits 54A and 56A respectively form an index separation circuit 62A. The integration and counter circuits 54A and 58A respectively are connected at their inputs to the transmission line 26 and the intelligence pulse generator circuit 22A is connected at its output to the transmission line 26.

For each of the other control switches, a control transmitter unit similar to that as above described and a signal detector unit such as shown in FIG. 3 are connected to the transmission line 26 although they are not illustrated. In the arrangement of FIG. 6, it is noted that the control transmitter units are disposed at their positions as determined by the position of the associated control switch.

Figure 7:
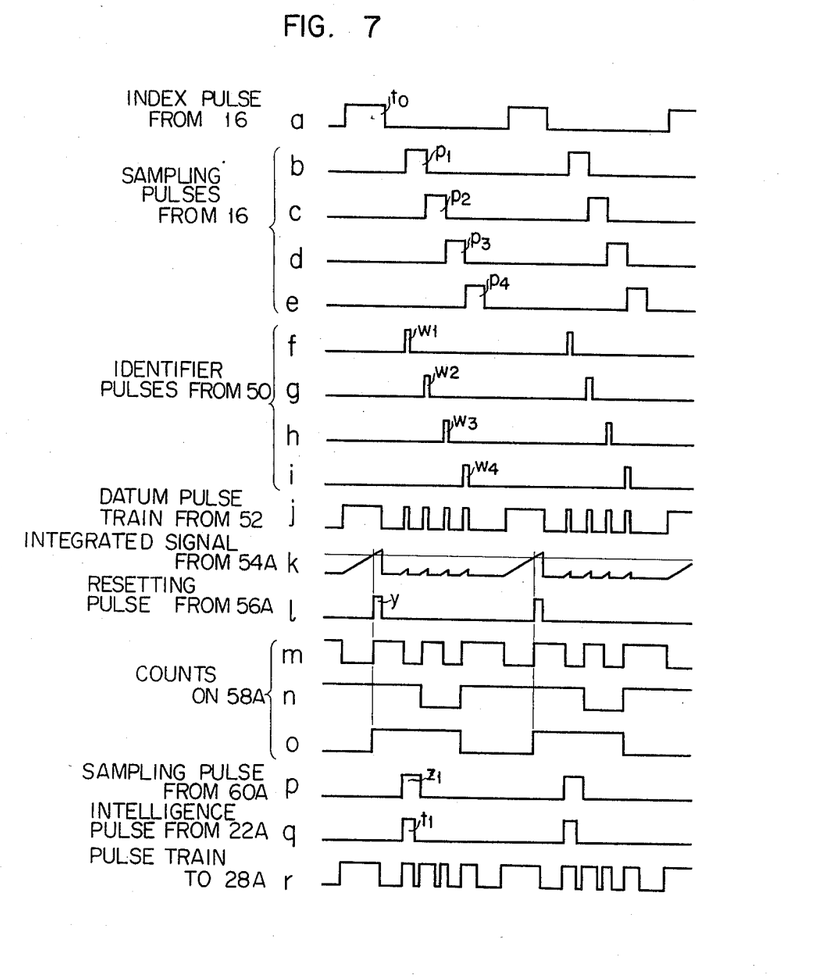
FIG. 7 is a graph illustrating waveforms developed at various points in the arrangement shown in FIG. 6.

As in the arrangement as shown in FIG. 3, the decoder circuit 16 successively generates an index pulse $t_o$ (see waveform $a$ shown in FIG. 7) and sampling pulses $p_1$, $p_2$, $p_3$ and $p_4$ (see waveforms $b$, $c$, $d$ and $e$ shown in FIG. 7). The index pulse $t_o$ is supplied to the combination or "OR" circuit 52 while the sampling pulses $p_1$, $p_2$, $p_3$ and $p_4$ are successively supplied to the identifier generator circuit 50. The generator circuit 50 is responsive to the leading edge of each sampling pulse to generate an identifier pulse $w_1$, $w_2$, $w_3$ or $w_4$ very short in duration as shown waveform $f$, $g$, $h$ or $i$ in FIG. 7. Each of the identifier pulses is operative to determine a time point at which the associated control transmitter such as shown by 10A generates a control pulse representative of intelligence provided by the control switch disposed therein. Therefore the identifier pulses $w_1$, $w_2$, $w_3$ and $w_4$ can be selected to be very short in duration so that the pulses are required only to be formed by differentiating the leading edges of the corresponding sampling pulses $p_1$, $p_2$, $p_3$ and $p_4$.

The identifier pulses thus generated are supplied to the combination circuit 52 where the pulses along with the index pulse $t_o$ are combined together into a datum pulse train as shown at waveform $j$ in FIG. 7. Then the datum pulse train is delivered to the transmission line 26.

The datum pulse train in the transmission line 26 is applied to the plurality of control transmitter units such as the unit 10A. For example, in the control transmitter unit 10A, the circuits 54A, 56A, 58A and 60A are operated in the same manner as the corresponding circuits 42A, 44A, 32A and 34A as above described in conjunction with FIG. 3 and 5 to develop output signals having waveforms $k$, $l$, $m$, $n$, $o$ and $p$ shown in FIG. 7 respectively. The waveform $p$ from the decoder circuit 60A or a pulse $z_1$ is supplied to the intelligence pulse generator circuit 22A to permit the latter to generate an intelligence pulse $t_1$ (see waveform $q$ shown in FIG. 7) containing an intelligence provided by the control switch 18A within the duration of the pulse $z_1$ the intelligence pulse $t_1$ is delivered to the transmission line 26. Similarly the other control transmitter units deliver intelligence pulses containing respective intelligences provided by the associated control switches.

Therefore an intelligence pulse train shown at waveform r in FIG. 7 as delivered to the transmission line 26 and then applied to a plurality of signal detector unit such as the unit 28A. In the signal detector units, the intelligence pulse train is processed in the same manner as above described in conjunction with FIGS. 3 and 5 for controlling the electric installations such as shown at 20A in FIG. 7.

If desired, the arrangement of FIG. 6 may be modified to include another transmission line along which only the index pulse is transmitted to the signal detector units. This modification necessarily uses the two transmission lines but it is advantageous in that, the transmission line is improved in efficiency of transmission because the intelligence pulse train is not required to include that space occupied by each of the index pulses and that the signal detector units are simple in construction because the index separation circuit has been omitted in each of the signal detector units.

In summary, the present invention comprises a transmitter unit including means for generating both a plurality of intelligence pulses in a predetermined order containing intelligences provided by respective signal sources and an index pulse on the basis of which the intelligence pulses are counted, a single transmission line for delivering the index pulse and intelligence pulses along the same, and a plurality of signal detector units one for each of electric installations to be controlled, each of the signal detector units including means for counting the intelligence pulses following each of the index pulses thereby to separate that intelligence pulse assigned to the associated electric installation for controlling the latter.

Therefore the present invention is required only to use a single power line for supplying electric power to a plurality of electric installations and a single intelligence transmission line for transmitting the intelligence pulses to the plurality of electric installations therealong, both lines forming what is required to make the connections to all the electric installations. Thus the connections are much simplified as compared with the prior art practice resulting in both improvements in reliability and a decrease in cost of the connections. Also the signal detector units are identical in circuit configuration to one another excepting that the decoder circuits involved are different from one another in the decoded pulse for separating a particular intelligence pulse from the intelligence pulse train. Therefore the present invention becomes very effective for forming the control system of an integrated circuitry.

While the present invention has been illustrated and described in conjunction with a few preferred embodiments thereof, it is to be understood that numerous changes and modifications may be resorted to without departing from the spirit and scope of the invention. For example, while the arrangements as shown in FIGS. 3 and 6 utilize 3-bit binary counts it is to be understood that, where $n$ is an integer greater than three the counter circuit may provide $n$-bit binary counts to use the contact closure or opening type of control switches whose number is equal to at most $2^n$ for controlling the associated electric installations. Also, in addition to the transmission of the closed or open position of each control switch, the present invention may be equally applicable to the transmission of analog signals provided by respective signal sources. In the latter case, the intelligence generator circuit 22 may be arranged to effect the pulse amplitude modulation (PAM) or pulse width modulation (PWM) of the analog signal from the control sources and each of the signal detector units demodulate the PAM or PWM signal to restore the original analog signal.

What we claim is:

1. A control system for controlling electrically powered devices provided on a vehicle or the like, comprising in combination, a transmitter unit comprising a plurality of signal sources providing output signals having information content, each of said signal sources corresponding to an electrically powered device to be controlled, an index generator circuit for generating index pulses, an intelligence generator circuit, circuit means for applying said index pulses and said signal sources output signals to said intelligence generator circuit to generate intelligence pulses having said information content of said signal sources output signals, and a control generator circuit for receiving said index pulses and said intelligence pulses to provide control pulse trains comprised of said index pulses and said intelligence pulses; a transmission line comprising a single conductor connected to an output of said control generator circuit; and a plurality of signal detector means connected to said transmission line for receiving said control pulse trains, each of said signal detector means corresponding to an electrically powered device, each of said signal detector means comprising means for receiving said control pulse trains for separating said index pulses from said pulse trains, a counter circuit, means for applying said control pulse trains and said separated index pulses to said counter circuit for counting said intelligence pulses after each of said intelligence pulses after said separated index pulses are applied thereto; a decoder circuit connected to an output of said counter for detecting a predetermined count thereof corresponding to an electrically powered device to provide a separation pulse in response thereto, an intelligence separation circuit receptive of said separation pulse and said control pulse trains to separate from said control pulse trains intelligence pulses corresponding to said predetermined count of said counter and said electrically powered device, a pulse discrimination circuit receptive of said intelligence pulses separated by said intelligence separation circuit for providing output signals representative of said information content thereof, and a driving circuit receptive of said pulse discrimination circuit output signals for driving a corresponding electrically powered device in response to said output signals from said pulse discrimination circuit.

2. A control system according to claim 1, wherein said discrimination circuit develops output signals representative of a duration of said intelligence pulses separated by said intelligence separation circuit.

3. A control system according to claim 1 wherein said means for separating said index pulses from said control pulse trains comprises an integrator receptive of said control pulse trains and a level detector in cascade with said integrator for developing an output signal when an output of said integrator exceeds a predetermined level.

4. A control system according to claim 1 wherein said transmitter unit comprises a clock for generating clock pulses, a counter, means for applying said clock pulses to said counter, said counter developing in response to said clock pulses a sequence of output signals representative of a sequence of $n$-bit binary numbers, a decoder for developing wide index pulses and sequences of narrow sampling pulses in response to said counter output signals, means for applying said counter output signals to said decoder, a plurality of signal sources providing output signals having information content, each of said signal sources corresponding to one of said counter output signals representative of an $n$-bit binary number, an intelligence generator circuit for developing a sequence of intelligence pulses each having said information content of a corresponding one of said signal sources in response to said signal source output signals and said sampling pulses, means for applying said signal sources output signals and said sampling signals to said intelligence generator circuit, and a control generator circuit receptive of said intelligence pulses and said index pulses for providing control pulse trains comprising said intelligence pulses and said index pulses.

* * * * *